(12) United States Patent
Lin (10) Patent No.: US 11,176,679 B2
(45) Date of Patent: Nov. 16, 2021

(54) PERSON SEGMENTATIONS FOR BACKGROUND REPLACEMENTS

(71) Applicant: Hewlett-Packard Development Company, L.P., Spring, TX (US)

(72) Inventor: Qian Lin, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/618,599

(22) PCT Filed: Oct. 24, 2017

(86) PCT No.: PCT/US2017/058043
§ 371 (c)(1),
(2) Date: Dec. 2, 2019

(87) PCT Pub. No.: WO2019/083509
PCT Pub. Date: May 2, 2019

(65) Prior Publication Data
US 2020/0258236 A1   Aug. 13, 2020

(51) Int. Cl.
*G06T 7/194* (2017.01)
*G06K 9/00* (2006.01)

(52) U.S. Cl.
CPC .......... *G06T 7/194* (2017.01); *G06K 9/00268* (2013.01); *G06T 2207/20224* (2013.01); *G06T 2207/30201* (2013.01)

(58) Field of Classification Search
CPC ........... G06T 7/194; G06T 2207/20224; G06T 2207/30201; G06T 5/005; G06T 7/11; G06K 9/00268; G06K 9/00369; G06K 9/00221; G06K 9/033; G06K 9/4628; G06K 9/00677
See application file for complete search history.

(56) References Cited

U.S. PATENT DOCUMENTS

| | | | |
|---|---|---|---|
| 6,282,317 B1 | 8/2001 | Lou et al. | |
| 9,117,112 B2 | 8/2015 | Carpenter et al. | |
| 9,560,271 B2 | 1/2017 | Na et al. | |
| 2005/0011959 A1 | 1/2005 | Grosvenor | |
| 2007/0174272 A1* | 7/2007 | Carter | G06K 9/72 |
| 2008/0002864 A1 | 1/2008 | Das et al. | |

(Continued)

FOREIGN PATENT DOCUMENTS

CA    2217366 A1    3/1999

OTHER PUBLICATIONS

Kumara, et al. "An Automatic Stranger Removal Photography System Using Panoramic Inpainting." J. Inf. Sci. Eng. 31, No. 6 (2015): 1919-1935.

(Continued)

*Primary Examiner* — Phuoc Tran
(74) *Attorney, Agent, or Firm* — Tong, Rea, Bentley & Kim LLC (57) ABSTRACT

In example implementations, a method is provided. The method may be executed by a processor. The method includes receiving an image. A person from a plurality of people within the image is identified. The person is segmented from the image. A background image of the image is replaced with a clean background image to remove the plurality of people from the image except the person that is identified.

16 Claims, 5 Drawing Sheets

(56) References Cited

U.S. PATENT DOCUMENTS

| | | | |
|---|---|---|---|
| 2011/0010776 A1* | 1/2011 | Ceraolo | G06Q 10/087 |
| | | | 726/28 |
| 2011/0038512 A1* | 2/2011 | Petrou | G06F 16/532 |
| | | | 382/118 |
| 2013/0301918 A1 | 11/2013 | Frenkel | |
| 2015/0286856 A1* | 10/2015 | Garcia | G06K 9/72 |
| | | | 382/118 |
| 2016/0269714 A1 | 9/2016 | Rhemann et al. | |
| 2017/0061200 A1* | 3/2017 | Wexler | G06K 9/00718 |
| 2017/0091951 A1* | 3/2017 | Yoo | G06T 7/11 |
| 2017/0174272 A1 | 6/2017 | Yonezawa et al. | |
| 2017/0236001 A1 | 8/2017 | Mclean | |

OTHER PUBLICATIONS

Memon, M. H. et al., "GEO matching regions: multiple regions of interests using content based image retrieval based on relative locations." Multimedia Tools and Applications 76, No. 14 (2017): 15377-15411.

\* cited by examiner

PERSON SEGMENTATIONS FOR BACKGROUND REPLACEMENTS

BACKGROUND

People enjoy capturing photographs when traveling, when at an event, and the like. People capture photographs to create a memory of the location that may include a popular scenery spot, landmark, building, and the like. The photograph can include a single person or multiple people. For example, the multiple people can include an individual and his or her friends or family, or the multiple people can include the individual and random people who are at the location or event.

DETAILED DESCRIPTION

Examples described herein provide an apparatus and a method for automatically segmenting an identified person or people for background replacements. As discussed above, some photographs may be taken at popular landmarks or locations with large crowds of people. A person may try to take a photograph of himself or herself at the location, but have other people that are also captured in the photograph.

Examples described herein provide a method to automatically identify a main subject of a photograph, segment the main subject, and automatically perform a background replacement in the photograph to remove unwanted people in the photograph. As a result, the user may have modified photographs that remove unwanted people from the photograph such that the user may have a "clean" photograph.

Figure 1:
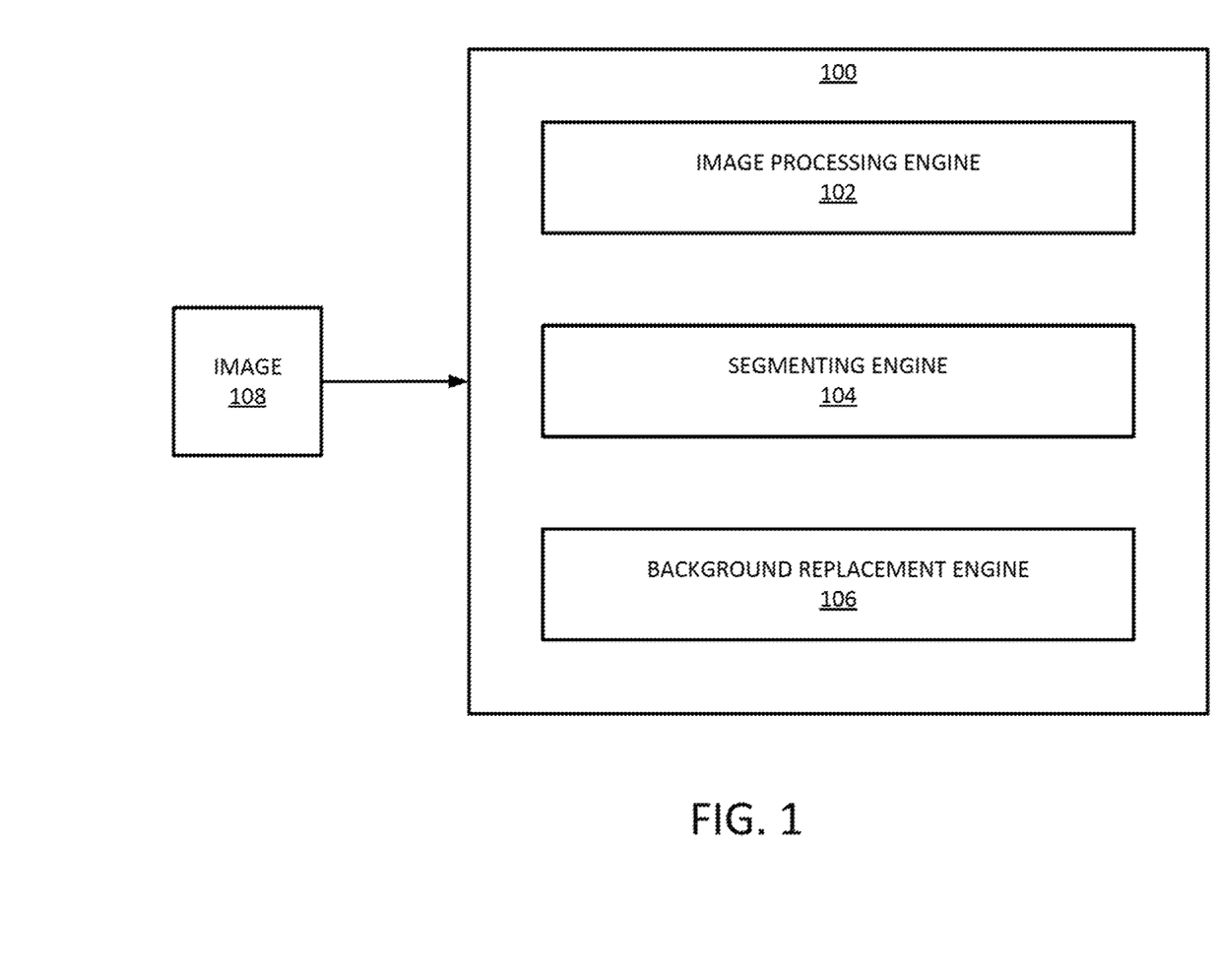
FIG. 1 is a block diagram of an example apparatus of the present disclosure.

FIG. 1 illustrates a block diagram of an apparatus 100. The apparatus 100 may be an image capturing device (e.g., a digital camera, portable computer with a camera, and the like) or a computer.

In one example, the apparatus 100 may include an image processing engine 102, a segmenting engine 104, and a background replacement engine 106. In one example, the image processing engine 102 and the segmenting engine 104 may be combined as part of a single convolutional neural network engine.

It should be noted that the apparatus 100 has been simplified for ease of explanation. For example, the apparatus 100 may include a processor that executes the functions of the image processing engine 102, the segmenting engine 104, and the background replacement engine 106. The apparatus 100 may include other components such as a lens, digital image processor, and the like for an image capturing device, or interfaces, memory, input/output devices, and the like for a computer.

In one example, the apparatus 100 may receive an image 108. The image 108 may be captured by the apparatus 100, received from a camera connected to the apparatus 100, received from a memory or external storage device, and the like. The image 108 may be a digital photograph, a still from a motion video, and the like.

Figure 2:
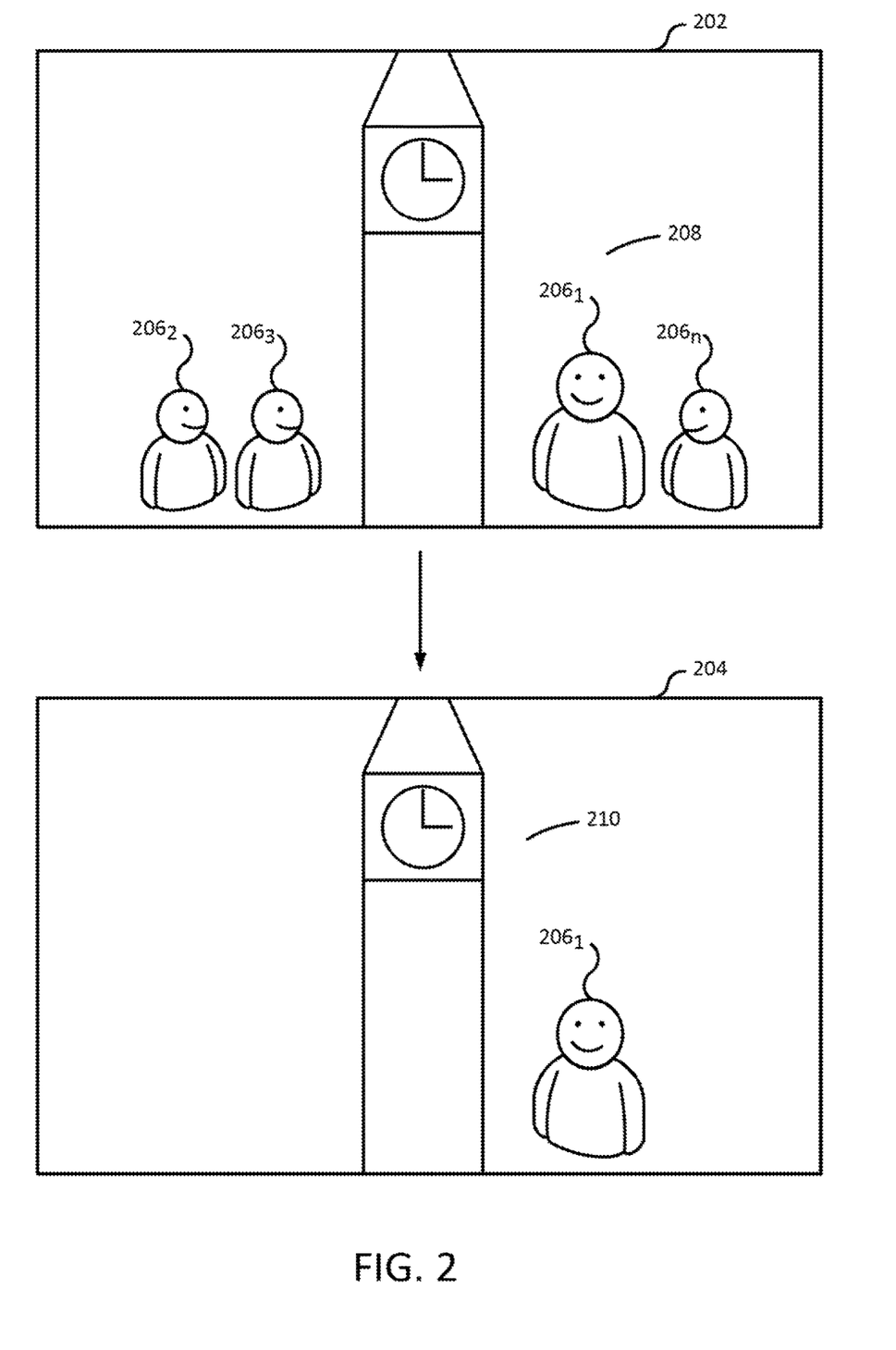
FIG. 2 is illustrates an example background image replacement of the present disclosure.

FIG. 2 illustrates an example of a digital photograph 202 that may represent an example of the image 108. The digital photograph 202 may include a plurality of people or subjects $206_1$ to $206_n$ (hereinafter also referred to individually as a person 206 or collectively as people 206). In one example, the digital photograph 202 may include a background image 208. In one example, the background image 208 may be a unique scene, location, monument, structure, and the like. One of the people 206 may be a main subject (e.g., the person $206_1$) who is taking a photograph with the background image 208. However, the additional subjects (e.g., the people $206_2$-$206_n$) may interfere with the background image 208.

In one example, the apparatus 100 may automatically identify the main subject (e.g., the person $206_1$) from a plurality of subjects (e.g., people $206_2$-$206_n$) that are detected and segmented from the digital photograph 202 and replace the background image 208 to remove all subjects except the main subject. For example, the image processing engine 102 may analyze the image 108 to identify the main subject.

In one example, the image processing engine 102 may detect people in the image 108 and identify the main subject based on a variety of different parameters associated with each subject in the image 108. The different parameters may include a size of a face, a direction of a face, a focus of a pixel associated with a subject, a facial expression, a proximity to other people, and the like.

Using the digital photograph 202 as an example, the image processing engine 102 may detect each person $206_1$ to $206_n$. Various different methods may be used to detect people in a digital image. For example, key features or landmarks may be detected based on training images, or models, to detect that pixels within a digital photograph are associated with a person. In another example, each pixel may be analyzed to determine a color of the pixel to determine if the pixel is associated with a person. In another example, object detection and analysis methods using histograms of oriented gradients (HoG), image classification models, machine learning, and the like, may be used.

After the people $206_1$ to $206_n$ are detected, the image processing engine 102 may then identify a main subject from the people $206_1$ to $206_n$ that are detected. For example, using the parameters noted above, the person $206_1$ may be identified as the main subject. For example, the person $206_1$ may have the largest size face and be facing the camera. Typically, the main subject is closest to the camera and faces the camera.

In addition, the person $206_2$-$206_n$ may be walking behind the person $206_1$. As a result, pixels associated with people $206_2$-$206_n$ may be blurred. In contrast, individuals who pose for a photograph will typically stand still. Thus, the person $206_1$ may be standing still, and the pixels associated with the person $206_1$ in the digital photograph 202 may have focused pixels, no blur, or a small amount of blur below a threshold value.

In some examples, facial expressions may be analyzed. As noted above, the image processing engine 102 may be able to identify landmarks associated with facial features (e.g., eyes, lips, nose, and the like) to identify people. These landmarks may also be analyzed to determine if a subject is smiling. For example, individuals who pose for a photograph will typically smile, whereas individuals who are walking by may have a neutral expression.

In one example, the proximity of people may determine if there is more than one main subject. For example, some photographs may have friends or a group of friends posing with the background image 208. As a result, if more than one person $206_1$-$206_n$ appears to be a main subject (e.g., has a largest face size, is facing the camera, is smiling, has focused pixels, and the like), but they are close to one another, then multiple people $206_1$-$206_n$ may be identified as main subjects. In one example "close" may be defined as having pixels of two different people $206_1$-$206_n$ adjacent to one another, or a distance between pixels of two different people $206_1$-$206_n$ is below a threshold (e.g., within 10 pixels of one another).

In one example, the main subject may be identified based on a comparison to a photo collection that is stored in a database or a memory. The database may be built with photographs captured during an "enrollment". Different people may have their photographs taken and these people may be enrolled as potential main subjects by detecting and extracting facial features. The photographs and facial features associated with each photograph may be stored in the database.

The photographs in the database may be face images of family members and friends that are collected during the "enrollment." When the facial feature of a detected face in the image to be processed matches one of the facial features in the database, this may mean that the person in the image is a family member or a friend and is, therefore, the main subject. If no facial features match, then the person may be a stranger, or a family member or friend who has not been enrolled in the database. If the person is a family member or a friend, the person can be enrolled into the database via a user interface (described below in FIG. 3). The person may then be recognized as the main subject in subsequent images that are processed that may include the person.

In one example, the facial features may be extracted for each person 206 that is detected in the digital photograph 202. The facial features may then be compared to facial features stored in the database. If the facial feature of a person 206 detected in the digital photograph 202 matches a facial feature stored in the database, the person 206 may be identified as a main subject. If multiple people 206 have facial features that match a facial feature stored in the database, then multiple people 206 may be identified as main subjects in the digital photograph 202.

In one example, a user interface may be used to confirm the identified main subject or identify additional main subjects that may have been missed by the image processing engine 102. An example of the user interface is discussed in further detail below in FIG. 3.

In one example, the segmenting engine 104 may segment the main subject (e.g., the person $206_1$) from the digital photograph 208. For example, the segmented image may remove the background image 208 and any remaining subjects (e.g., people $206_2$-$206_n$) from the image. Any type of segmentation process may be used. For example, the segmentation can be performed using a fully convolutional neural network that is trained using a dataset with manually segmented images, K-means clustering, thresholding, compression-based methods, histogram-based methods, edge detection based methods, region-growing methods, and the like.

As noted above, in one example, the detection of people, the identification of a main subject from the people 206 detected in an image, and the segmentation of the main subject may be performed in a single step via a single convolutional neural network. In one example, a discrete convolution, *, of a one-dimensional signal "F" and a filter "h" at a location "r" may be $(F*h)(r)=\Sigma_{s+t=r}F(s)h(t)$. In one example, an l-dilated convolution, $*_l$, may be defined as $(F*_l h)(r)=\Sigma_{s+lt=r}F(s)h(t)$, where l is defined as a dilation factor. It should be noted that a discrete convolution is a 1-dilated convolution. A series of convolutional layers with dilation factors may be designed to increase the receptive field exponentially, which may lead to more accurate segmentation results.

After the main subject is segmented, the background replacement engine may find a replacement background image to replace the original background image 208 and all remaining subjects (e.g., the people $206_2$-$206_n$). For example, referring back to FIG. 2, a modified digital photograph 204 may illustrate a replacement background image 210.

In one example, the replacement background image 210 may include the same unique scene, location, monument, structure, and the like of the background image 208. However, the replacement background image 210 may be a "clean" image that does not include the remaining people $206_2$-$206_n$. As a result, the main subject (e.g., the person $206_1$) may have a clean photograph that removes unwanted people that may detract from the photograph.

In one example, the replacement background image 210 may be obtained from other photographs taken by the person $206_1$ and stored in a personal storage device. For example, the person $206_1$ may have taken many photographs at the same location, scene, in front of the same landmark, and the like. The photographs may be stored on a local hard disk drive, an external storage medium, and the like, of the person $206_1$ and connected to the apparatus 100 so that they are accessible by the background replacement engine 106. The background replacement engine 106 may analyze the additional photographs and look for another photograph that includes the background image 208 without the people $206_2$-$206_n$.

In one example, the photographs may have global positioning system (GPS) coordinates. For example, some image capturing devices may embed, mark, or store GPS coordinates on the digital photographs that are captured. As a result, the background replacement engine 106 may read the GPS coordinate data from the digital photograph 202 and look for other photographs that have matching GPS coordinate data. Those photographs may then be analyzed to determine if there are no unwanted subjects and if they are "clean" background images (e.g., by the image processing engine 102).

In another example, the GPS coordinate data may be used to search the Internet for a clean background image. For example, GPS coordinate data may identify the scene, monument, structure, building, landmark, and the like. The background replacement engine 106 may search for images based on the GPS coordinate data or by entering search terms associated with the scene, monument, structure, building, landmark, and the like. The matching images may be analyzed to determine if there are no unwanted subjects and if they are "clean" background images (e.g., by the image processing engine 102).

In one example, the background image 208 may be replaced by any replacement background image. For example, the main subject may want to choose a different location, scene, monument, building, landmark, and the like, in the replacement background image than is seen in the original background image 208.

Figure 3:
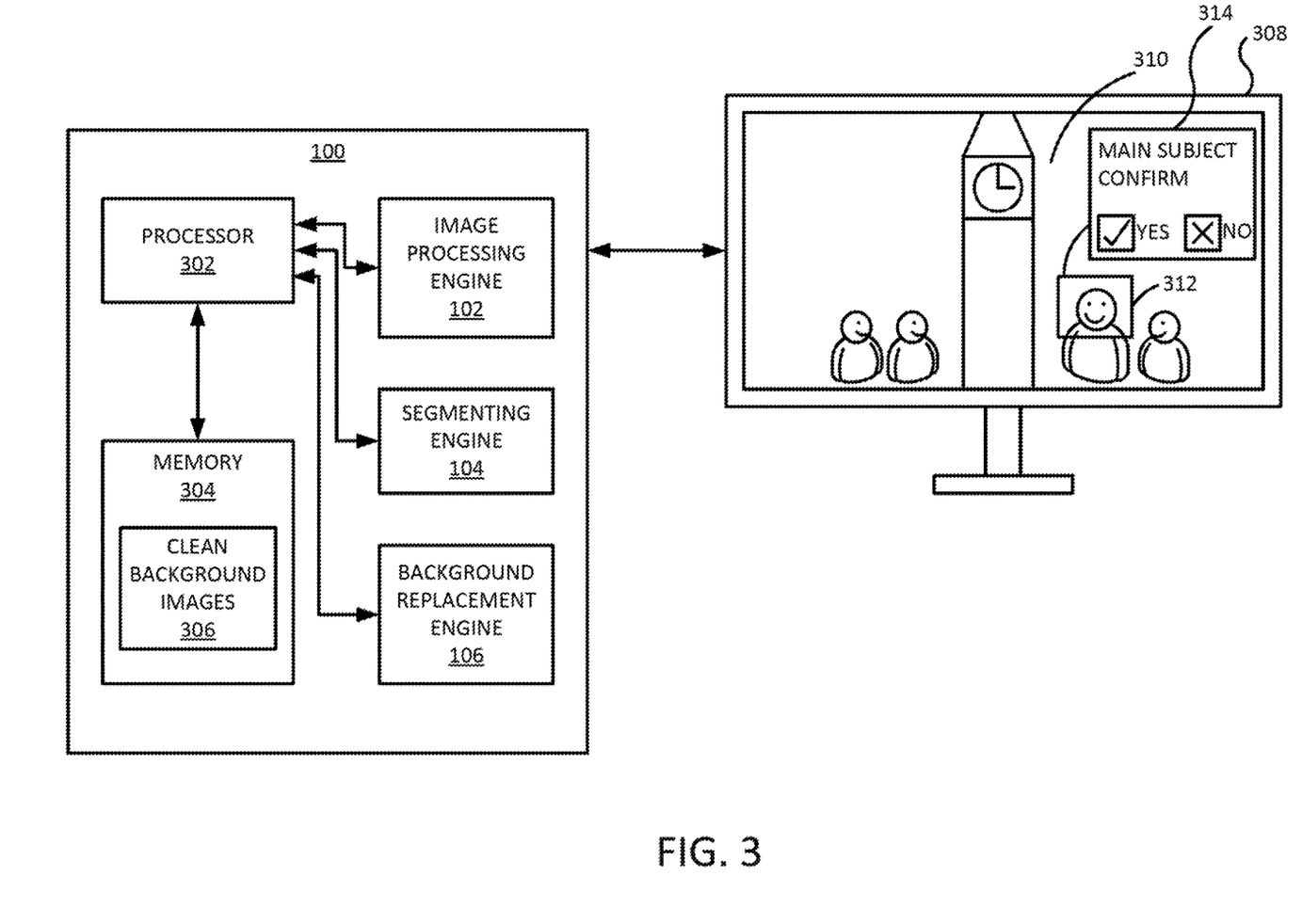
FIG. 3 is a block diagram of the example apparatus and a graphical user interface (GUI) of the present disclosure.

FIG. 3 illustrates another example of the apparatus 100. In one example, the apparatus 100 may include a processor 302 and a memory 304. The processor 302 may control operation of the image processing engine 102, the segmenting engine 104, and the background replacement engine 106.

In one example, the memory 304 may be a non-transitory computer readable memory (e.g., a hard disk drive, an external storage drive, a random access memory (RAM), and the like). The memory 304 may store clean background images 306. The clean background images 306 may be images collected from other images taken by a user or images collected from the Internet, as described above.

In one example, the apparatus 100 may be communicatively coupled to a display 308. The display 308 may be an integrated part of the apparatus 100 (e.g., a display on a camera) or may be an external display (e.g., a monitor connected to a computer). The display 308 may provide a graphical user interface (GUI) 310.

The GUI 310 may be used to confirm identification of a main subject identified by the image processing engine 102, or to help the image processing engine 102 identify additional main subjects. For example, after the image processing engine 102 analyzes the image 108 and identifies a main subject, the apparatus 100 may cause the display 308 to provide a prompt 314 on the GUI 310. The GUI 310 may show the image 108 and provide a highlight, marking, or a box 312 around an identified main subject. The prompt 314 may ask a user to confirm (e.g., indicate by pressing a "yes" button or a "no" button on the GUI 310) that the main subject has been correctly identified.

In another example, the user may use an input device (e.g., a mouse to move a pointer on the GUI 310 or using a pen or finger if the display 308 is a touch screen) to select additional main subjects. As noted above, some images 108 may include multiple main subjects (e.g., a group photograph, photograph of friends, a couple, and the like). The image processing engine 102 may sometimes use the assistance of a user and the GUI 310 to identify additional main subjects if there is more than one main subject.

As a result, the apparatus 100 may automatically perform a background replacement based on main subjects that are identified in a digital photograph. The background replacement may provide a "clean" background image that removes unwanted people from the photograph such that the user may have a more enjoyable picture in front of a particular background. The apparatus 100 may perform the background replacement with no, or a limited amount, of user interaction.

Figure 4:
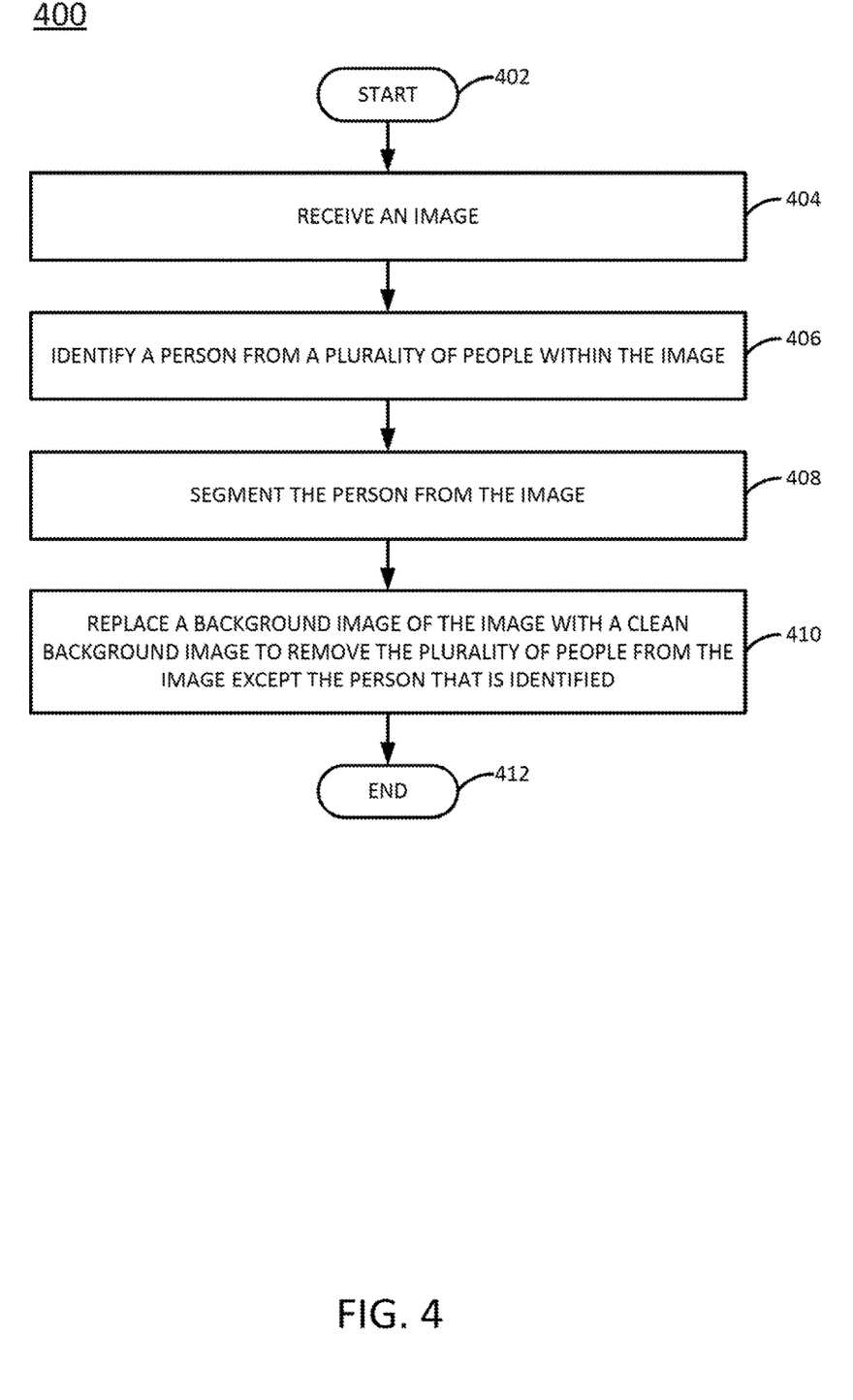
FIG. 4 is a flow chart of an example method for replacing a background image of an image based on a segmentation of a person in the image.

FIG. 4 illustrates a flow diagram of an example method 400 for replacing a background image of an image based on a segmentation of a person in the image. In one example, the method 400 may be performed by the apparatus 100.

At block 402, the method 400 begins. At block 404, the method 400 receives an image. For example, the image may be captured by the apparatus if the apparatus is an image capturing device such as a camera. In another example, the image may be received from a camera or a storage medium if the apparatus is a computer. The image may be a digital photograph or a still image from a motion video.

At block 406, the method 400 identifies a person from a plurality of people within the image. In one example, an image processing engine may detect people within the image using any type of digital image processing. For example, the image processing engine may use key features or landmarks may be detected based on training images, or models, to detect that pixels within a digital photograph are associated with a person. In another example, each pixel may be analyzed to determine a color of the pixel to determine if the pixel is associated with a person. In another example, object detection and analysis methods using histograms of oriented gradients (HoG), image classification models, machine learning, and the like, may be used.

The person who is identified may be a main subject of the image. The image processing engine may identify the person or main subject from the plurality of people who are detected within the image using different parameters associated with each person in the image. The parameters may be facial attributes that include a size of a face, a direction of a face, a focus of a pixel associated with a subject, a facial expression, a proximity to other people, and the like.

In one example, a weighting factor, or value, may be applied to the parameters or facial attributes. In one example, the weighting factors may sum to a value of one. For example, a direction of the face (e.g., a face looking at the camera) and the focus of the pixel (e.g., the person is standing still or posing) may be deemed to have a high importance and be assigned the greatest weighting factor of 0.3. The size of the face (e.g., faces closer to the camera) may be assigned a weighting factor of 0.2 and the facial expression (e.g., smiling vs a neutral expression) may be assigned a weighting factor of 0.2.

In one example, a GUI may be used to display the identified person to a user. The user may then confirm that the image processing engine has correctly identified the person or people within the image who are the main subject or subjects.

In one example, the GUI may be used to identify additional people within the image who may also be the main subject. For example, the image may include friends who are taking a picture together and standing on opposite sides of a landmark. The user may select both people within the image as the main subject if the image processing engine is unable to identify both people as the main subject.

At block 408, the method 400 segments the person from the image. After the person is identified from the plurality of people that were detected in the image, the person may be segmented from the image. For example, a segmenting engine may segment the person from the image to remove the background image and any remaining people who were in the image. Any type of segmentation process may be used. For example, the segmentation can be performed using a fully convolutional neural network that is trained using a dataset with manually segmented images, K-means clustering, thresholding, compression-based methods, histogram-based methods, edge detection based methods, region-growing methods, and the like. In one example, as noted above, the block 406 and the block 408 may be performed as a single step by a single convolutional neural network.

At block 410, the method 400 replaces a background image of the image with a clean background image to remove the plurality of people from the image except the person who is identified. For example, a background replacement engine may replace the background image with the clean background image. The clean background image may include the same unique scene, location, monument, structure, and the like of the background image. The clean background image may be obtained from other photographs taken by the person who is identified and stored in a personal storage device (e.g., an external USB drive, an external memory card of a camera, a hard disk drive of a computer, and the like). The personal storage device may be accessible by the background replacement engine.

In another example, the background replacement engine may obtain GPS coordinates associated with the image. The GPS coordinates may be used to identify the scene, monument, structure, building, landmark, and the like, associated with the image. The background replacement engine may generate a search on the Internet for images based on the GPS coordinate data or by entering search terms associated with the scene, monument, structure, building, landmark, and the like. The matching images obtained from the search based on the GPS coordinates can be used as the clean background image to replace the background image. At block 412, the method 400 ends.

Figure 5:
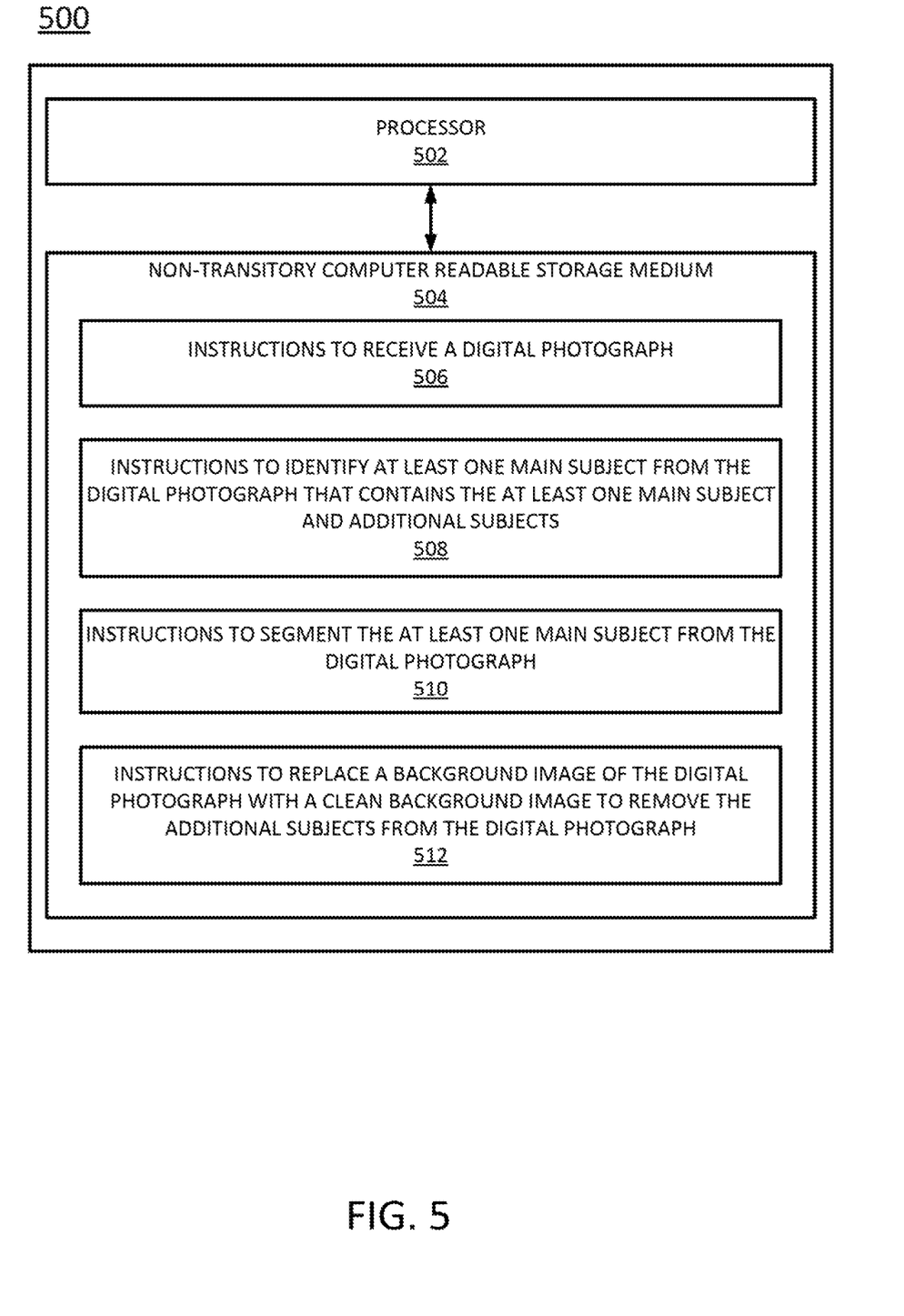
FIG. 5 is a block diagram of an example non-transitory computer readable storage medium storing instructions executed by a processor.

FIG. 5 illustrates an example of an apparatus 500. In one example, the apparatus 500 may be the apparatus 100. In one example, the apparatus 500 may include a processor 502 and a non-transitory computer readable storage medium 504. The non-transitory computer readable storage medium 504 may include instructions 506, 508, 510, and 512 that, when executed by the processor 502, cause the processor 502 to perform various functions.

The instructions 506 may include instructions to receive a digital photograph. The instructions 508 may include instructions to identify at least one main subject from the digital photograph that contains the at least one main subject and additional subjects. The instructions 510 may include instructions to segment the at least one main subject from the digital photograph. The instructions 512 may include instructions to replace a background image of the digital photograph with a clean background image to remove the additional subjects from the digital photograph.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method comprising:
 receiving, by a processor, an image of a plurality of people against a scene of a background image;
 identifying, by the processor, a person from the plurality of people within the image;
 segmenting, by the processor, the identified person within the image to remove the background image and the plurality of people other than the identified person from the image; and
 replacing, by the processor, the background image within the image with a clean background image of a same scene as the background image without any people against the scene, resulting in the image having just the identified person, and not the plurality of people other than the identified person, against the scene.

2. The method of claim 1, wherein the identifying and the segmenting are performed by a single convolutional neural network.

3. The method of claim 1, wherein the identifying comprises:
 causing, by the processor, the person that is identified to be displayed to a user; and
 receiving, by the processor, a confirmation that the person is correctly identified.

4. The method of claim 1, wherein the identifying is performed based on at least one parameter associated with each one of the plurality of people in the image.

5. The method of claim 4, wherein the at least one parameter comprises a size, a direction of a face, a focus of a pixel, a facial expression, or a proximity to other people of the plurality of people.

6. The method of claim 1, wherein the identifying, comprises:
 extracting, by the processor, facial features for each person that is detected in the image; and
 comparing, by the processor, the facial features for the each person that is detected in the image to a plurality of facial features stored in a database.

7. The method of claim 1, wherein the replacing comprises:
 identifying the clean background image, by the processor, by identifying another image of the same scene that does not include any people and that has matching global positioning system (GPS) data as the image.

8. A non-transitory computer readable storage medium encoded with instructions executable by a processor, the non-transitory computer-readable storage medium comprising:
 instructions to receive a digital photograph of a plurality of subjects against a scene of a background image;
 instructions to identify a main subject from the plurality of subjects;
 instructions to segment the identified main subject within the digital photograph to remove the background image and the plurality of subjects other than the identified main subject from the digital photograph; and
 instructions to replace the background image within the digital photograph with a clean background image of a same scene as the background image without any people against the scene, resulting in the digital photograph having just the identified main subject, and not the plurality of subjects other than the identified main subject, against the scene.

9. The non-transitory computer readable storage medium of claim 8, wherein the instructions to identify comprise:
 instructions to cause the main subject to be displayed to a user;
 instructions to receive a selection of a different subject from the plurality of subjects; and
 instructions to include the the different subject as another main subject.

10. The non-transitory computer readable storage medium of claim 8, wherein the identifying is performed based on at least one facial attribute associated with each one of the plurality of subjects in the digital photograph.

11. The non-transitory computer readable storage medium of claim 10, wherein the at least one facial attribute comprises a plurality of facial attributes, wherein each one of the plurality of facial attributes is associated with a weighting factor.

12. The non-transitory computer readable storage medium of claim 8, wherein the instructions to replace comprise:
 instructions to identify the clean background image by identifying another image of the same scene that does not include any people and that has matching global positioning system (GPS) data as the image.

13. The non-transitory computer readable storage medium of claim 12, wherein the clean background image is retrieved from other digital photographs stored in a personal storage device.

14. An apparatus comprising:
 a processor; and
 a non-transitory computer-readable data storage medium storing instructions executable by the processor to:

identify, within an image of a plurality of people against a scene of a background image, a person from the plurality of people;

segment the identified person within the image to remove the background image and the plurality of people other than the identified person from the image; and replace the background image with the image with a clean background image of a same scene as the background image without any people against the scene, resulting in the image having just the identified person, and not the plurality of people other than the identified person, against the scene.

15. The apparatus of claim 14, comprising:

a computer readable storage medium to store additional photographs, wherein the additional photographs are analyzed to identify the clean background image from the additional photographs.

16. The apparatus of claim 15, wherein the the clean background image is identified by identifying another image of the same scene that does not include any people and that has matching global positioning system (GPS) data as the image.

* * * * *